United States Patent
Yang (10) Patent No.: US 9,914,439 B2
(45) Date of Patent: Mar. 13, 2018

(54) BRAKE SYSTEM HAVING PEDAL SIMULATOR

(71) Applicant: Hyundai Motor Company, Seoul (KR)

(72) Inventor: Byeong Cheol Yang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/214,842

(22) Filed: Jul. 20, 2016

(65) Prior Publication Data

US 2017/0166176 A1 Jun. 15, 2017

(30) Foreign Application Priority Data

Dec. 11, 2015 (KR) ......................... 10-2015-0177145

(51) Int. Cl.
| | |
|---|---|
| *B60T 8/40* | (2006.01) |
| *B60T 7/08* | (2006.01) |
| *B60T 7/04* | (2006.01) |
| *B60T 13/14* | (2006.01) |
| *B60T 13/16* | (2006.01) |
| *B60T 13/74* | (2006.01) |

(52) U.S. Cl.
CPC .............. *B60T 8/409* (2013.01); *B60T 7/042* (2013.01); *B60T 7/085* (2013.01); *B60T 8/4086* (2013.01); *B60T 13/146* (2013.01); *B60T 13/166* (2013.01); *B60T 13/745* (2013.01); *B60T 8/4081* (2013.01); *B60T 2270/82* (2013.01)

(58) Field of Classification Search
CPC ........ B60T 8/409; B60T 7/085; B60T 8/4086; B60T 2270/82; B60T 13/166; B60T 13/146; B60T 13/745; B60T 8/4081; B60T 7/042

USPC ................................................ 303/15, 113.4
See application file for complete search history.

(56) References Cited

U.S. PATENT DOCUMENTS

| | | | | |
|---|---|---|---|---|
| 4,405,183 A | * | 9/1983 | Resch ..................... | B60T 8/441 303/114.2 |
| 4,505,116 A | * | 3/1985 | Weiler .................. | B60T 11/203 60/547.1 |

(Continued)

FOREIGN PATENT DOCUMENTS

| | | |
|---|---|---|
| JP | 2012-136100 A | 7/2012 |
| JP | 2014-040187 A | 3/2014 |

(Continued)

*Primary Examiner* — Thomas J Williams
*Assistant Examiner* — Mariano Sy
(74) *Attorney, Agent, or Firm* — Mintz Levin Cohn Ferris Glovsky and Popeo, P.C.; Peter F. Corless (57) ABSTRACT

A hydraulic booster brake system is provided. The system includes a pedal simulator capable of achieving an enhancement in backup braking performance and in design freedom of the pedal simulator. The system includes a main master cylinder that is connected to a brake pedal while being connected to the pedal simulator via the pedal-side hydraulic line, and a sub master cylinder that is connected to the brake pedal while being connected to the pedal simulator and a fluid reservoir via the pedal-side hydraulic line. A first simulator valve is installed at a portion of the pedal-side hydraulic line between the main master cylinder and the pedal simulator. A second simulator valve is installed at a portion of the pedal-side hydraulic line between the sub master cylinder and the fluid reservoir.

16 Claims, 7 Drawing Sheets

(56) References Cited

U.S. PATENT DOCUMENTS

| | | | | |
|---|---|---|---|---|
| 4,604,870 | A * | 8/1986 | Bach | B60T 13/145 60/551 |
| 4,715,661 | A * | 12/1987 | Leiber | B60T 7/042 188/345 |
| 5,024,056 | A * | 6/1991 | Zivkovic | B60T 13/143 60/550 |
| 5,070,699 | A * | 12/1991 | Leiber | B60T 8/26 60/581 |
| 5,201,573 | A * | 4/1993 | Leiber | B60T 8/26 303/113.4 |
| 6,203,119 | B1 * | 3/2001 | Towers | B60T 8/4072 303/114.1 |
| 8,544,962 | B2 * | 10/2013 | Ganzel | B60T 8/4077 303/10 |
| 9,346,443 | B2 * | 5/2016 | Koo | B60T 11/20 |
| 2011/0024242 | A1 * | 2/2011 | Yang | B60L 7/26 188/106 P |
| 2012/0161505 | A1 * | 6/2012 | Koyama | B60T 1/10 303/9.62 |
| 2015/0232076 | A1 * | 8/2015 | Oosawa | B60T 13/147 303/10 |

FOREIGN PATENT DOCUMENTS

| | | |
|---|---|---|
| JP | 2014-169041 A | 9/2014 |
| KR | 10-2010-0093069 A | 8/2010 |
| KR | 10-2012-0031391 A | 4/2012 |
| KR | 10-1157796 B1 | 6/2012 |
| KR | 10-2013-0123786 A | 11/2013 |
| KR | 10-1359337 B1 | 2/2014 |
| KR | 10-2014-0083838 A | 7/2014 |
| KR | 2014-0134570 A | 11/2014 |
| KR | 2014-0135043 A | 11/2014 |
| KR | 2014-0140404 A | 12/2014 |
| KR | 10-2015-0059035 A | 5/2015 |
| WO | 2005-0108179 A1 | 11/2005 |
| WO | 2011-0104047 A1 | 9/2011 |

* cited by examiner

BRAKE SYSTEM HAVING PEDAL SIMULATOR

CROSS-REFERENCE TO RELATED APPLICATION

This application claims under 35 U.S.C. § 119(a) the benefit of priority to Korean Patent Application No. 10-2015-0177145 filed on Dec. 11, 2015, the entire contents of which are incorporated herein by reference.

BACKGROUND (a) Technical Field

The present invention relates to a brake system for a vehicle, and more particularly, to a hydraulic booster brake system, which includes a pedal simulator for generating a pedal feel based on an engagement degree of the driver, to generate hydraulic pressure required for braking based on a braking intent of the driver, and to supply the generated hydraulic pressure to a wheel brake.

(b) Background Art

Recently developed vehicles utilize brake-by-wire technology using an electronic control system, for control of braking, in place of general hydraulic control systems known in the art. In such an electronically controlled brake system, hydraulic pressure required for braking based on a braking intent of the driver is generated through use of an electric motor. The hydraulic pressure generated based on driving of the motor is transferred to a wheel brake (wheel cylinder) of each wheel and, accordingly, a braking force is generated. Such an electronically controlled brake system, which controls hydraulic pressure, using an electronic actuator, is typically referred to as an "electro-hydraulic brake system (EHB)", namely, an "electronic hydraulic brake system".

The electronic hydraulic brake system controls braking forces generated at respective wheels in an independent manner Accordingly, it may be possible to realize functions associated with, for example, electronic stability control (ESC) or anti-lock brake system (ABS). A pump is often used as an electronic actuator, which is used in a general hydraulic booster brake system, namely, an electronic hydraulic brake system as mentioned above.

The pump converts rotating force generated during driving of a motor into linear force to move a piston in forward and backward directions. In accordance with the movement of the piston, brake fluid in a chamber of a cylinder is pressurized, thereby generating hydraulic pressure.

In this electronic hydraulic brake system, a sensor is configured to sense a pedal stroke generated based on pedal depression (e.g., engagement degree) of the driver, and the pump generates hydraulic pressure based on the sensed results through driving of the motor, and, as such, braking forces of respective wheels are controlled. In addition, the electronic hydraulic brake system is equipped with a pedal simulator that enables the driver to perceive a pedal feel as in a general hydraulic brake system. In particular, when the driver depresses or engages a pedal connected to a master cylinder, hydraulic pressure of brake fluid in a master cylinder is increased. The hydraulic pressure from the master cylinder is transferred to the pedal simulator via a pedal-side hydraulic line and, as such, a pedal feel is generated from the pedal simulator.

In addition, in response to depression of the brake pedal by the driver, a controller is configured to calculate a target hydraulic pressure desired by the driver, based on a driver's pedal input (e.g., braking input) sensed through a brake pedal sensor (e.g., pedal stroke sensor), namely, a pedal stroke value. Based on the calculated target hydraulic pressure, the controller is configured to drive the motor, to cause the pump to generate hydraulic pressure. The hydraulic pressure generated from the pump is transferred to each wheel cylinder and, as such, a desired braking force is obtained.

Meanwhile, in a conventional electronic hydraulic brake system, the side of a master cylinder and the side of a pedal simulator are connected via a pedal-side hydraulic line. In addition, in such a conventional electronic hydraulic brake system, operation of a motor in an electronic actuator is stopped when the system fails. Particularly, a cut valve is opened, to allow hydraulic pressure generated from the master cylinder based on a foot effort of the driver to be directly transferred to the wheel brake (wheel cylinder). Thus, braking force is generated by the hydraulic pressure of the master cylinder.

In connection with this, for an increase in the braking force generated by the foot effort of the driver when the system has failed, it is necessary to reduce the inner diameter of the master cylinder. However, when the inner diameter of the master cylinder is reduced, the hydraulic pressure at the side of the pedal simulator connected to the master cylinder via the pedal-side hydraulic line may be increased at a given pedal stroke. Particularly, durability of elements of the pedal simulator, for example, a spring and a rubber damper, may be insufficient.

For an increase in durability of the spring and damper of the pedal simulator, it is necessary to increase the size of the pedal simulator. However, there is a limitation in increasing the size of the pedal simulator due to an increase in seal friction of the pedal simulator and a limited engine compartment layout space. In this regard, reducing the inner diameter of the master cylinder has a limitation in enhancing a backup braking performance, namely, a function of generating braking force by hydraulic pressure generated from the master cylinder by a foot effort (e.g., an engagement degree) of the driver in an opened state of the cut valve when the system has failed.

SUMMARY

The present invention provides a hydraulic booster brake system that includes a pedal simulator capable of achieving an enhancement in backup braking performance and an enhancement in design freedom of the pedal simulator.

In one aspect, the present invention provides an electronic hydraulic brake system that may include a brake pedal to be operated by a driver for braking of a vehicle, a master cylinder connected to the brake pedal, to generate a hydraulic pressure upon receiving a foot effort (e.g., an engagement degree or pedal depression) of the driver via the brake pedal, and a pedal simulator connected to the master cylinder via a pedal-side hydraulic line, to provide a pedal feel based on the depression effort of the driver, using the hydraulic pressure generated from the master cylinder, wherein the master cylinder may include a main master cylinder connected to the brake pedal while being connected to the pedal simulator via the pedal-side hydraulic line, and a sub master cylinder connected to the brake pedal while being connected to the pedal simulator and to a fluid reservoir via the pedal-side hydraulic line. Additionally, a first simulator valve may be installed at a portion of the pedal-side hydraulic line between the main master cylinder and the pedal simulator, and a second simulator valve may be installed at a portion of the pedal-side hydraulic line between the sub master cylinder and the fluid reservoir.

In an exemplary embodiment, a check valve may be installed at a portion of the pedal-side hydraulic line between the sub master cylinder and the pedal simulator, to prevent reverse flow of fluid from the pedal simulator to the sub master cylinder while allowing fluid only to flow from the sub master cylinder to the pedal simulator. In another exemplary embodiment, the electronic hydraulic brake system may further include a controller configured to execute opening and closing operations of the first and second simulator valves, to open the first simulator valve while closing the second simulator valve upon receiving a braking input generated based on operation of the brake pedal by the driver.

In addition, the pedal-side hydraulic line may include a hydraulic line portion branched from a hydraulic line portion between the sub master cylinder and the second simulator valve, and connected to the pedal simulator. The branched hydraulic line portion may be joined to a hydraulic line portion between the pedal simulator and the first simulator valve, and a check valve may be installed at the branched hydraulic line portion, to prevent reverse flow of fluid from the pedal simulator to the sub master cylinder while allowing fluid only to flow from the sub master cylinder to the pedal simulator.

Further, the electronic hydraulic brake system may further include a controller configured to execute opening and closing operations of the first and second simulator valves, to open the first simulator valve while closing the second simulator valve upon receiving a braking input generated based on operation of the brake pedal by the driver. The controller may be configured to execute opening and closing operations of the first and second simulator valves based on a mode selected from among pedal feel modes by the driver upon receiving a braking input generated based on operation of the brake pedal by the driver.

The pedal feel modes may include a pedal feel normal mode in which the first simulator valve is opened, and the second simulator valve is closed, and a pedal feel soft mode in which the first and second simulator valves are opened. The electronic hydraulic brake system may further include a pressure generator configured to generate a braking hydraulic pressure, wheel brakes each configured to receive the braking hydraulic pressure generated from the pressure generator, to generate a braking force to restrict rotation of a corresponding one of wheels, and a hydraulic pressure supply line that connects the pressure generator to the wheel brakes, to supply the braking hydraulic pressure generated from the pressure generator to the wheel brakes, wherein at least one cut valve may be installed at a fluid line connecting the hydraulic pressure supply line to the pedal-side hydraulic line.

In addition, the electronic hydraulic brake system may further include a controller configured to execute opening and closing operations of the first and second simulator valves and opening and closing operations of the cut-off valve. The controller may be configured to close the first simulator valve while opening the second simulator valve and the cut-off valve when failure of the pressure generator occurs.

The hydraulic pressure supply line may include a first sub hydraulic pressure supply line configured to supply a braking hydraulic pressure from the pressure generator to one pair of the wheel brakes, and a second sub hydraulic pressure supply line configured to supply the braking hydraulic pressure from the pressure generator to the other pair of the wheel brakes. A first cut valve may be installed at a fluid line that connects the first sub hydraulic pressure supply line to a portion of the pedal-side hydraulic line between the first simulator valve and the main master cylinder, and a second cut valve may be installed at a fluid line that connects the second sub hydraulic pressure supply line to the main master cylinder.

The electronic hydraulic brake system may further include a controller configured to execute opening and closing operations of the first and second simulator valves and opening and closing operations of the first and second cut valves. The controller may be configured to close the first simulator valve while opening the second simulator valve and the first and second cut valves when failure of the pressure generator occurs.

In addition, the electronic hydraulic brake system may further include a pressure generator configured to generate a braking hydraulic pressure, wheel brakes each configured to receive the braking hydraulic pressure generated from the pressure generator, to generate a braking force to restrict rotation of a corresponding one of wheels, and a hydraulic pressure supply line that connects the pressure generator to the wheel brakes, to supply the braking hydraulic pressure generated from the pressure generator to the wheel brakes. A boosting valve may be installed at the hydraulic pressure supply line that connects the pressure generator to the wheel brakes. A pressure reducing valve may be installed at a fluid line branched from the hydraulic pressure supply line and connected to the fluid reservoir.

The electronic hydraulic brake system may further include a controller configured to execute operation of the boosting valve and operation of the pressure reducing valve, to operate the pressure generator or the boosting and pressure reducing valves based on a depression effort of the driver, thereby adjusting a braking hydraulic pressure supplied to the wheel brakes via the hydraulic pressure supply line.

The hydraulic pressure supply line may include a first sub hydraulic pressure supply line configured to supply a braking hydraulic pressure from the pressure generator to one pair of the wheel brakes, and a second sub hydraulic pressure supply line configured to supply the braking hydraulic pressure from the pressure generator to the other pair of the wheel brakes. Boosting valves may be installed respectively at the first and second sub hydraulic pressure supply lines. Pressure reducing valves may be installed respectively at fluid lines each branched from a corresponding one of the sub hydraulic pressure supply lines and connected to the fluid reservoir.

In still yet another exemplary embodiment, the controller may be configured to operate the boosting valves and the pressure reducing valves to operate the pressure generator or the boosting and pressure reducing valves based on a depression effort of the driver, thereby adjusting a braking hydraulic pressure supplied to the wheel brakes via the sub hydraulic pressure supply lines.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

Figure 1:
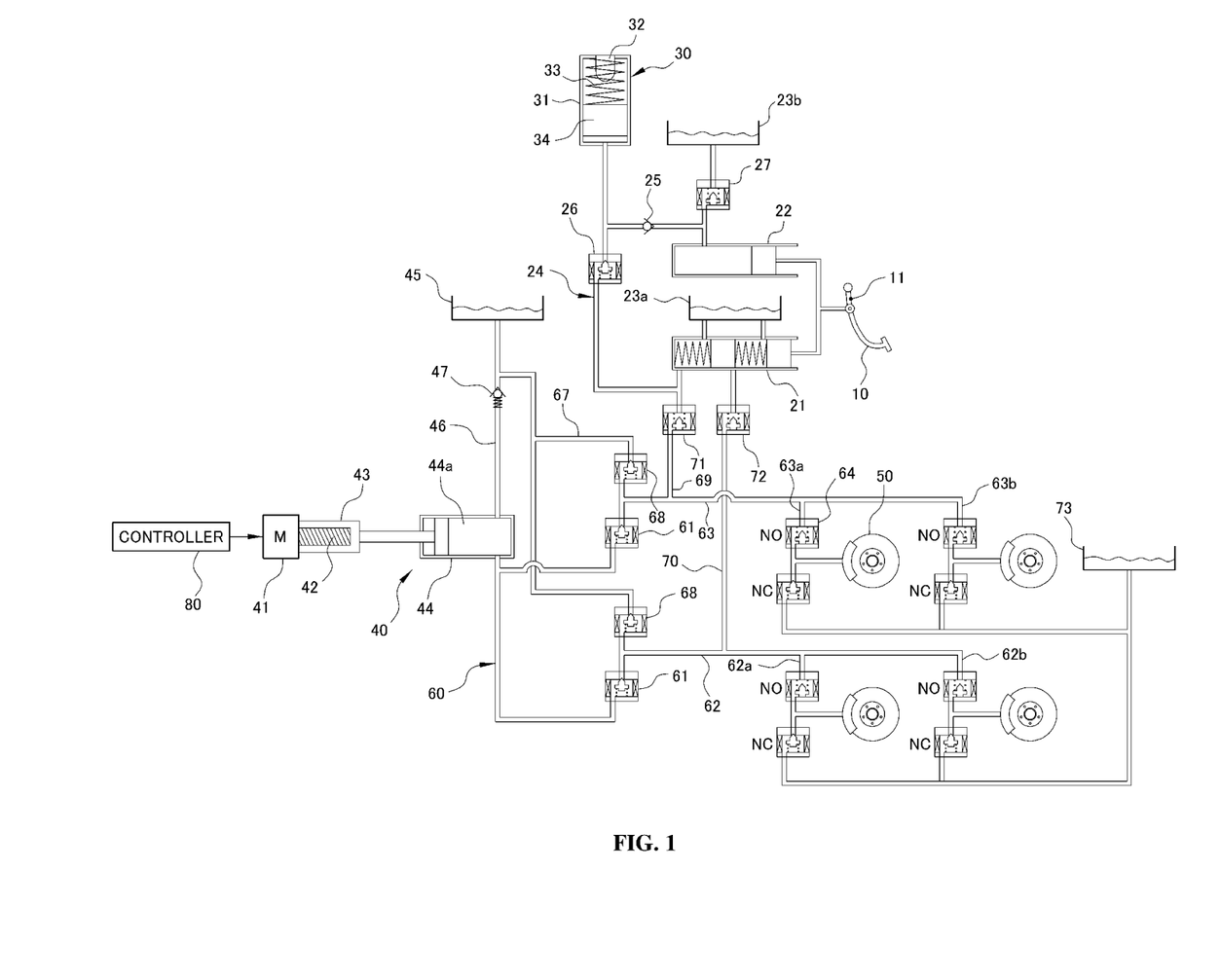
FIG. 1 is a circuit diagram illustrating a brake system according to an exemplary embodiment of the present invention.

FIG. 1 is a circuit diagram illustrating a brake system according to an exemplary embodiment of the present invention. The present invention provides a brake system capable of improving a hydraulic booster brake system including a pedal simulator, namely, achieving an enhancement in backup braking performance and achieving an enhancement in design freedom of the pedal simulator.

In accordance with an exemplary embodiment of the present invention, a hydraulic booster brake system, which may be implemented as an electronic hydraulic brake system, is provided. In particular, in the electronic hydraulic brake system, as an electronic actuator, a pump may be used to convert rotating force generated during driving of a motor 41 into linear force to move a piston 43 in forward and backward directions. In accordance with the movement of the piston 43, brake fluid in a pressurizing chamber 44a of a cylinder 44 may be pressurized, thereby generating hydraulic pressure.

In accordance with an exemplary embodiment of the present invention, the electronic hydraulic brake system may include a brake pedal 10 as a braking input unit to be operated by the driver for braking of a vehicle, a braking input detecting sensor 11 configured to detect a braking input value from the brake pedal 10, a pressure generator 40 configured to generate a braking hydraulic pressure, and wheel cylinders 50 each configured to receive the braking hydraulic pressure generated from the pressure generator 40, to generate a braking force to restrict rotation of a corresponding one of wheels. The electronic hydraulic brake system may further include a hydraulic pressure supply line 60 that connects the pressure generator 40 to the wheel cylinders 50, to supply the braking hydraulic pressure generated from the pressure generator 40 to the wheel cylinders 50, and a controller 80 configured to operate the pressure generator 40 to generate a target braking hydraulic pressure, based on a signal from the braking input detecting sensor 11.

The configuration of the above-described electronic hydraulic brake system will be described in more detail. The electronic hydraulic brake system may further include fluid reservoirs 23a and 23b configured to store brake fluid therein, main and sub master cylinders 21 and 22 respectively connected to the fluid reservoirs 23a and 23b, and connected to the brake pedal 10, to generate hydraulic pressure when the driver depresses the brake pedal 10 (e.g., when a foot effort of the driver is applied to the brake pedal 10 or pressure is exerted onto the brake pedal 10), and a pedal simulator 30 connected to the main and sub master cylinders 21 and 22 via a pedal-side hydraulic line 24, to provide a pedal feel based on a foot effort of the driver, using the hydraulic pressure generated by the two master cylinders 21 and 22. Thus, in the electronic hydraulic brake system according to the exemplary embodiment of the present invention, the master cylinder connected to the brake pedal 10 may be constituted by two master cylinders connected in parallel between the brake pedal 10 and the pedal simulator 30, namely, the main master cylinder 21 and the sub master cylinder 22.

In the above-described configuration, the brake pedal 10 may be connected to both the main master cylinder 21 and the sub master cylinder 22 and, as such, hydraulic pressure may be generated from both the main master cylinder 21 and the sub master cylinder 22 when the driver depresses the brake pedal 10 and then a foot effort may be applied to the brake pedal 10. In addition, in a pedal feel soft mode as will be described later, it may be possible to generate hydraulic pressure for generation of a pedal feel, only by one master cylinder, in particular, the main master cylinder 21, through operation of first and second simulator valves 26 and 27.

The main master cylinder 21 has no configuration difference from a master cylinder mounted in a general electronic hydraulic brake system. However, the electronic hydraulic brake system according to the exemplary embodiment of the present invention differs from the general electronic hydraulic brake system in that, in addition to the main master cylinder 21, another master cylinder, to which the brake pedal 10 is connected, separately from the main master cylinder 21, namely, the sub master cylinder 22, is provided.

Particularly, the main master cylinder 21 and sub master cylinder 22 may be connected to the pedal simulator 30 in parallel via the pedal-side hydraulic line 24. The pedal simulator 30 has no configuration difference from a pedal simulator mounted in the general electronic hydraulic brake system. The pedal simulator 30 may include a housing 31, at least one spring 33, a damper 32, and a piston 34 supported by the spring 33. The piston 34 may be moved by hydraulic pressure generated from the two master cylinders 21 and 22 (or the main master cylinder 21) and, as such, the pedal simulator 30 may be configured to generate repulsive pedal sensation, namely, a pedal feel, and may be configured to apply (e.g., transmit) the generated pedal feel to the driver through the brake pedal 10. Similarly to connection of the fluid reservoir 23a to the main master cylinder 21, the fluid reservoir 23b may be connected to the sub master cylinder 22. Although respective fluid reservoirs are provided at the master cylinders 21 and 22 in the illustrated exemplary embodiment, a common fluid reservoir connected to both the master cylinders may also be used.

In the above-described configuration, when the brake pedal 10 is depressed, a foot effort of the driver may be transferred to respective pistons (not designated by any reference numeral) of the main and sub master cylinders 21 and 22 through the brake pedal 10. As a result, the pistons may be moved forwards and, as such, pressurize fluid in the master cylinders 21 and 22, thereby generating hydraulic pressure. The generated hydraulic pressure may be transferred to the pedal simulator 30 via the pedal-side hydraulic line 24.

Further, at a hydraulic line portion between the sub master cylinder 22 and the pedal simulator 30 in the pedal-side hydraulic line 24 installed to transfer the pressure of the pressurized fluid to the pedal simulator 30, a check valve 25 may be installed, to prevent reverse flow of fluid from the pedal simulator 30 to the sub master cylinder 22 while allowing fluid only to flow from the sub master cylinder 22 to the pedal simulator 30. The check valve 25 may be configured to prevent hydraulic pressure generated from the main master cylinder 21 from being transferred to the pedal-side hydraulic line portion at the side of the sub master cylinder 22.

Thus, since both the main master cylinder 21 and the sub master cylinder 22 may be coupled to the brake pedal 10 while being connected to the pedal simulator 30 via the pedal-side hydraulic line 24, the main master cylinder 21 and sub master cylinder 22 may be configured to simultaneously generate hydraulic pressure when the driver depresses the brake pedal 10 and, as such, the hydraulic pressure generated from the main master cylinder 21 and the hydraulic pressure generated from the sub master cylinder 22 may be transferred simultaneously to the pedal simulator 30.

In addition, the first simulator valve 26 may be installed at the pedal-side hydraulic line 24 between the main master cylinder 21 and the pedal simulator 30. The second simulator valve 27 may be installed at a fluid line that connects the sub master cylinder 22 to the fluid reservoir 23b. Further, whether hydraulic pressure is generated in the pedal-side hydraulic line portion at the side of each master cylinder 21 or 22, for operation of the pedal simulator 30, may be determined by a controller based on opening or closing operation of the two simulator valves, namely, the first simulator valve 26 and second simulator valve 27.

Referring to FIG. 1, it can be seen that, in the configuration of the pedal-side hydraulic line 24, a hydraulic line portion branched from a hydraulic line portion between the sub master cylinder 22 and the second simulator valve 27 may be connected to the pedal simulator 30. In addition, it can be seen that, in the configuration of the pedal-side hydraulic line 24, a hydraulic line portion where the check valve 25 is installed may be joined to a hydraulic line portion between the pedal simulator 30 and the first simulator valve 26, and a first cut valve 71 may be installed at a fluid line 69 that connects the hydraulic pressure supply line 60 to a hydraulic line portion between the first simulator valve 26 and the main master cylinder 21.

Meanwhile, the pressure generator 40 in the electronic hydraulic brake system according to the exemplary embodiment of the present invention may include a piston pressing type pump driven by the motor 41. Operation of the pump is may be executed by the controller 80. In other words, as the controller 80 drives the motor 41, the pump may be configured to generate target braking hydraulic pressure. In this regard, the pump has no configuration difference from a piston pressing type pump used in the general electronic hydraulic brake system. In other words, the pump may be a piston (plunger) pressing type pump in which the piston 43 may be configured to generate and adjust hydraulic pressure while moving forwards or backwards based on linear force converted from rotating force of the motor 41. Such a configuration is well known in the art and, as such, no detailed description thereof will be given.

For example, conversion of rotating force of the motor 41 into linear force of the piston 43 in the above-described pump may be achieved by the configuration described herein below. A ball screw 42 may be mounted to a rotating shaft of the motor 41, to be rotatable together with the rotating shaft; the piston 43 may be engaged with an outer surface of the ball screw 42 and, as such, may be moved forwards or backwards along an inside of the cylinder 44 during rotation of the ball screw 42. When the piston 43 moves forwards, fluid in the pressurizing chamber 44*a* of the cylinder 44 may be pressurized, thereby generating hydraulic pressure.

Lines and accessories such as a fluid line 46 installed between the pump and a fluid reservoir 45 and a check valve 47 installed at the fluid line 46 have no configuration difference from those of the piston pressing type pump used in the general electronic hydraulic brake system. The pump, which includes the motor 41 and piston 43, may be connected to the hydraulic pressure supply line 60 to supply hydraulic pressure to the wheel cylinders 50. In particular, the hydraulic pressure supply line 60 may be connected to the pressurizing chamber 44*a* of the pump, and may be connected to the wheel cylinder 50 of each wheel, for transfer of hydraulic pressure.

Thus, braking hydraulic pressure generated during operation of the pump may be supplied to the wheel cylinder 50 of each wheel via the hydraulic pressure supply line 60. A boosting valve 61 may be installed at the hydraulic pressure supply line 60 that connects the pump to the wheel cylinder 50 of each wheel. The hydraulic pressure supply line 60 where the boosting valve 61 is installed may be connected to the wheel cylinder 50 of each wheel through an inlet valve 64 to supply hydraulic pressure generated by the pump. In addition, a return line 65 may be branched from the hydraulic pressure supply line 60 connected to the wheel cylinder 50 of each wheel. The return line 65 may be connected to a fluid reservoir 73 through an outlet valve 66.

In an exemplary embodiment, the inlet valve 64 may be a normally open (NO) valve, and the outlet valve 66 may be a normally close (NC) valve. In the illustrated exemplary embodiment, as the inlet valve 64 and outlet valve 66, one ABS NO valve and one NC valve may be installed per wheel, to independently adjust pressure of each wheel. In the illustrated exemplary embodiment, the hydraulic pressure supply line 60 connected to the pressurizing chamber 44*a* of the pump may include two branched hydraulic pressure supply lines, that is, a first sub hydraulic pressure supply line 62 and a second sub hydraulic pressure supply line 63.

In addition, each of the branched sub hydraulic pressure supply lines 62 and 63 may be branched into two hydraulic pressure supply lines, that is, lines 62*a* and 62*b* or lines 63*a* and 63*b*. The finally-branched hydraulic pressure supply lines 62*a*, 62*b*, 63*a*, and 63*b* may be connected to respective wheel cylinders 50 of the wheels. Fluid lines 67 respectively branched from the first and second sub hydraulic pressure supply lines 62 and 63 may be connected to the fluid reservoir 45. Each fluid line 67 may be joined to a line portion above the check valve 47 of the fluid line 46 that connects the pump to the fluid reservoir 45.

A pressure reducing valve 68 may be installed at each fluid line 67 connected to the fluid reservoir 45 branched from a corresponding one of the first and second sub hydraulic pressure supply lines 62 and 63. Additionally, the adjustment of wheel pressure by each wheel cylinder 50 (wheel brake) configured to generate braking force at the corresponding wheel may be executed by operation of the motor 41 or the boosting valve 61 and pressure reducing valve 68. One boosting valve 61 and one pressure reducing valve 68 may be installed per hydraulic circuit, that is, in each of a primary hydraulic circuit including the first sub hydraulic pressure supply line 62 and a secondary hydraulic circuit including the second sub hydraulic pressure supply line 63.

In addition to the type in which hydraulic pressure is generated based on conversion of rotational movement of the motor 41 into linear movement of the piston 43, as described above, other types may be applied to the brake system of the present invention. For example, the brake system of the present invention may use a type in which hydraulic pressure of fluid pumped by the pump driven through rotation of the motor 41 is stored in a high pressure accumulator, and then wheel pressure (e.g., wheel cylinder pressure-hydraulic pressure) for generating braking force may be adjusted by operating the pressure reducing valve 68 and boosting valve 61.

Furthermore, the hydraulic supply line 60, in more detail, the first sub hydraulic pressure supply line 62 and second sub hydraulic pressure supply line 63, may be connected to the pedal-side hydraulic line 24 and main master cylinder 21 via fluid lines 70 and 69 respectively branched from the first sub hydraulic pressure supply line 62 and second sub hydraulic pressure supply line 63 downstream of respective boosting valves 61. The first cut valve 71 may be installed at the fluid line 69 that connects the second sub hydraulic pressure supply line 63 to the pedal hydraulic line 24. A second cut valve 72 may be installed at the fluid line 70 that connects the first sub hydraulic pressure supply line 62 to the main master cylinder 21. The first cut valve 71 and second cut valve 72 may be configured to cut off supply of hydraulic pressure generated based on a foot effort (e.g., a depression amount) of the driver and hydraulic pressure generated by the pump for generation of braking force, namely, wheel pressure adjusted for generation of braking force.

The configuration of the electronic hydraulic brake system according to the illustrated exemplary embodiment of the present invention has been described. As described above, a master cylinder configuration in which two cylinders, that is, the cylinders 21 and 22, may be arranged in parallel with respect to the pedal simulator 30 and, accordingly, the pressurizing area of the master cylinder may be increased in a normal control mode.

Accordingly, an improvement in design freedom of the pedal simulator 30 may be achieved.

In this regard, rigidity of the spring 33 and damper 32 may be reduced and, thus, it may be possible to achieve an increase in durability of the pedal simulator 30 and an enhancement in pedal feel (e.g., prevention of heavy pedal depression at an initial stage of braking). In addition, deviation between constituent elements in the pedal simulator may be reduced and, as such, braking feel deviation may be advantageously reduced. When the system fails, the pressurizing area of the master cylinder may be minimized (using only the main master cylinder). Accordingly, it may be possible to enhance backup braking performance of generating braking force by hydraulic pressure generated from the master cylinder by a foot effort of the driver in an opened state of the first and second cut valves 71 and 72. In addition, under the condition that desired rigidity of the spring 33 and damper 32 of the pedal simulator 30 has already been secured even at a reduced master cylinder diameter, it may be possible to variably adjust a pedal feel based on a setting operation of the user through operation of the first and second simulator valves 26 and 27 and, as such, marketability of the vehicle may be enhanced.

Figure 2:
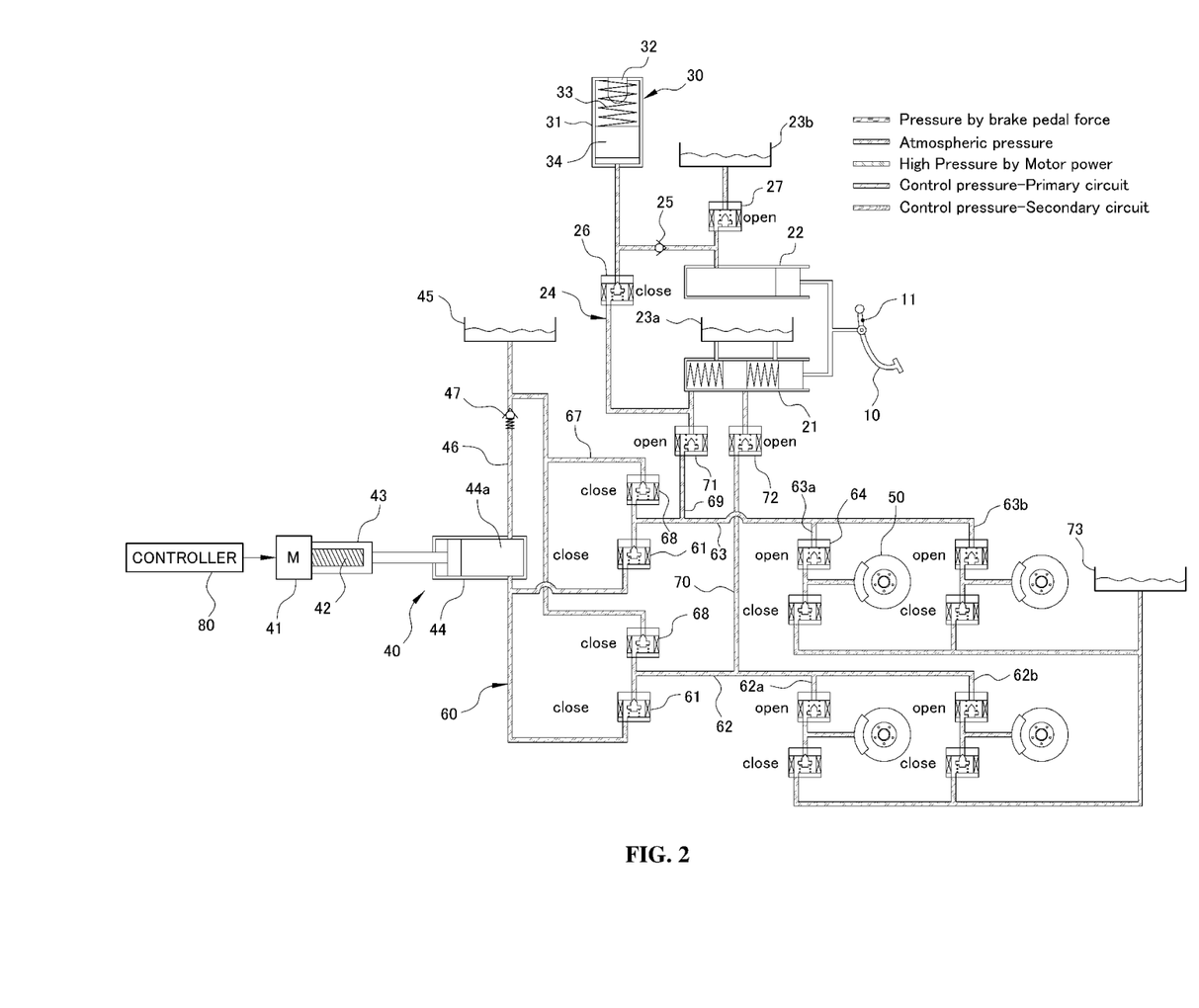
FIGS. 2 and 3 are diagrams illustrating operation states of the brake system according to the exemplary embodiment of the present invention.
Figure 3:
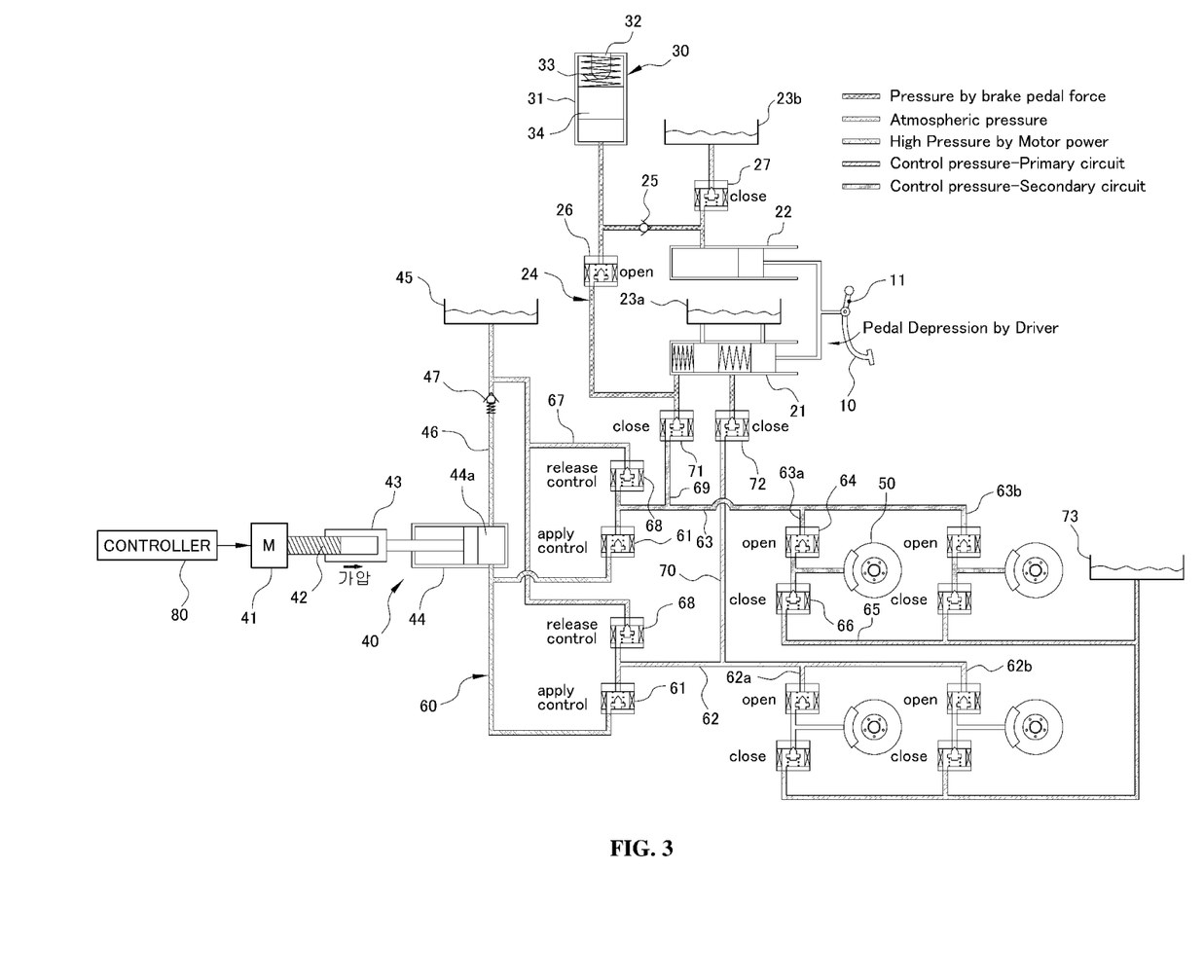

Hereinafter, a control method of the above-described brake system according to the illustrated exemplary embodiment of the present invention and operation states according to the control method will be described. FIG. 2 is a diagram illustrating a standby state before braking of the brake system according to the illustrated exemplary embodiment of the present invention. FIG. 3 is a diagram illustrating a control state during braking.

Referring to FIG. 2 illustrating a state before depression of the brake pedal 10, the first simulator valve 26 is an NC valve, the second simulator valve 27 is an NO valve, the first and second cut valves 71 and 72 are NO valves, and the boosting valve 61 and pressure reducing valve 68 are NC valves, as may be seen from states of respective valves before valve driving control.

The state of FIG. 3 compared to that of FIG. 2 is a state in which braking hydraulic pressure is generated as the driver depresses the brake pedal 10. In other words, FIG. 3 illustrates a state in which, as each wheel cylinder 50 receives braking hydraulic pressure, braking force may be generated at the corresponding wheel brake by hydraulic pressure of the wheel cylinder 50. When the brake pedal 10 is depressed or engaged, the braking input detecting sensor 11, which may be, for example, a pedal stroke sensor, may be configured to detect a pedal stroke. Based on information regarding the detected pedal stroke, the controller 80 may be configured to determine a braking desire or intent of the driver.

In addition, the controller 80 may be configured to determine target hydraulic pressure for generation of braking force, using a pedal stoke value, which is the braking input value from the driver. Using the target hydraulic pressure as a target value, the controller 80 may be configured to drive the motor 41 of the pump to generate and adjust braking hydraulic pressure to be transferred to each wheel cylinder 50 via the hydraulic pressure supply line 60.

Thus, the braking hydraulic pressure generated by the pump may be transferred to each wheel cylinder 50 (e.g., wheel brake) via the hydraulic pressure supply line 60 and, as such, braking of the vehicle may be achieved.

In the above-described braking state, based on a control signal from the controller 80, the first simulator valve 26 may be opened, the second simulator valve 27 may be closed, and both the first cut valve 71 and the second cut-off valve 72 may be closed. In particular, hydraulic pressure may be generated by both the main master cylinder 21 and the sub master cylinder 22 and, thus, a pedal feel based on a foot effort of the driver may be applied to the driver by hydraulic pressure acting in the pedal-side hydraulic line 24 between the pedal simulator 30 and the two master cylinders 21 and 22.

Further, based on the closing of the first cut valve 71 and second cut valve 72, the pedal-side hydraulic line 24 and hydraulic pressure supply line 60 may be cut off and, thus, pressure (e.g., hydraulic pressure) generated by the foot effort of the driver and braking hydraulic pressure adjusted by the pump may be cut off. In addition, braking pressure transferred to each wheel cylinder 50 after being generated in the hydraulic pressure supply line 60 may be adjusted by the motor 41 of the pump, the corresponding boosting valve 61 (apply control) and the corresponding pressure reducing valve 68 (release control). In particular, the boosting valve 61 and pressure reducing valve 68 installed in the primary hydraulic circuit and the boosting valve 61 and pressure reducing valve 68 installed in the secondary hydraulic circuit may be operated independently based on the corresponding hydraulic circuits and, as such, hydraulic pressure of each hydraulic circuit may be adjusted independently.

Accordingly, it may be possible to independently adjust braking hydraulic pressure and braking force in the wheel cylinders 50 included in the primary hydraulic circuit and braking hydraulic pressure and braking force in the wheel cylinders 50 included in the secondary hydraulic circuit based on the corresponding hydraulic circuits.

Particularly, the primary hydraulic circuit may include the first sub hydraulic pressure supply line 62, the boosting valve 61 installed at the first sub hydraulic pressure supply line 62, the fluid line 67 branched from the first sub hydraulic pressure supply line 62, the pressure reducing valve 68 installed at the fluid line 67, the hydraulic pressure supply lines 62*a* and 62*b* branched from the first sub hydraulic pressure supply line 62, one pair of wheel cylinders 50 connected to the hydraulic pressure supply lines 62*a* and 62*b*, the inlet valve 64 and outlet valve 66 respectively installed for the wheel cylinders 50, and the return line 65, at which the outlet valve 66 is installed.

Meanwhile, the secondary hydraulic circuit may include the second sub hydraulic pressure supply line 63, the boosting valve 61 installed at the second sub hydraulic pressure supply line 63, the fluid line 67 branched from the second sub hydraulic pressure supply line 63, the pressure reducing valve 68 installed at the fluid line 67, the hydraulic pressure supply lines 63*a* and 63*b* branched from the second sub hydraulic pressure supply line 63, one pair of wheel cylinders 50 connected to the hydraulic pressure supply lines 63*a* and 63*b*, the inlet valve 64 and outlet valve 66 respectively installed for the wheel cylinders 50, and the return line 65, at which the outlet valve 66 is installed.

Figure 4:
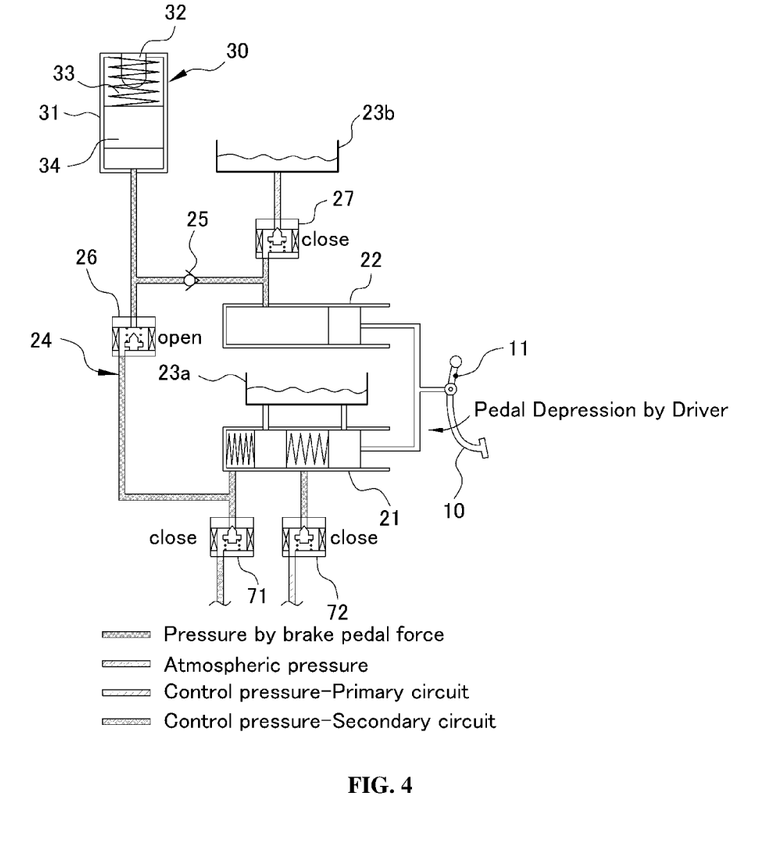
FIG. 4 is a diagram illustrating an operation state of the brake system according to the exemplary embodiment of the present invention in a pedal feel normal mode.
Figure 5:
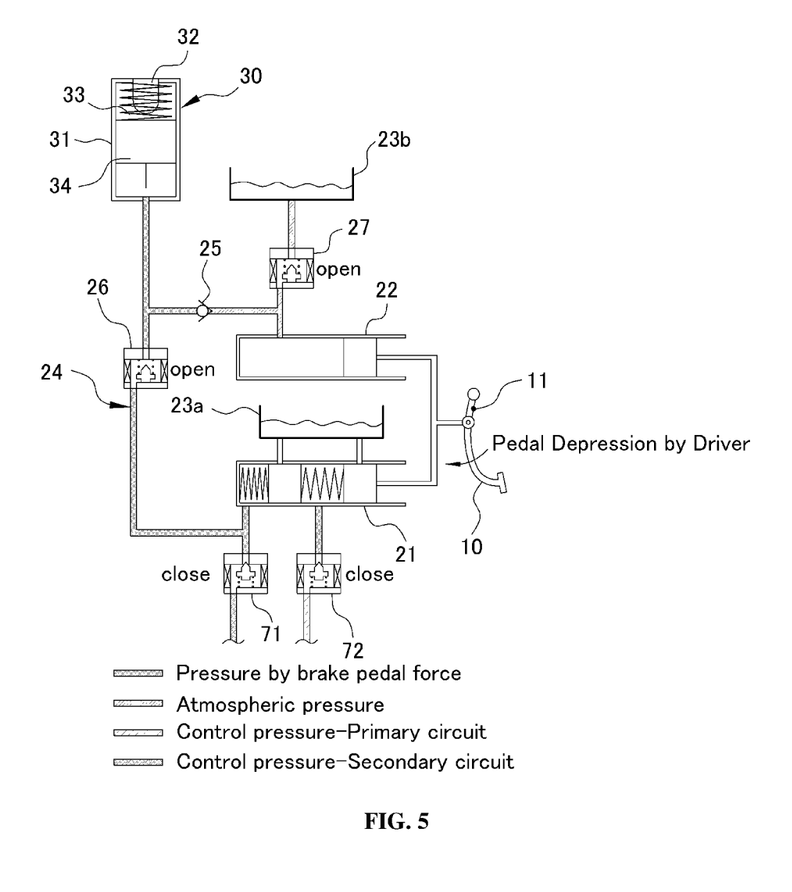
FIG. 5 is a diagram illustrating an operation state of the brake system according to the exemplary embodiment of the present invention in a pedal feel soft mode.

Hereinafter, a procedure of generating a pedal feel during braking will be described with reference to FIGS. 4 and 5. FIG. 4 is a diagram illustrating a typical pedal feel normal mode. In the pedal feel normal mode, it may be possible to achieve mode switching to a pedal feel soft mode as illustrated in FIG. 5 by operating the first and second simulator valves 26 and 27.

In FIG. 3, the first simulator valve 26 and second simulator valve 27 are illustrated as being in a pedal feel normal mode state as in FIG. 4. Referring to FIG. 5, the pedal-side hydraulic line 24 at the side of the main master cylinder 21 may be separated from the pedal-side hydraulic line 24 at the side of the sub master cylinder 22 by the check valve 25. When both the simulator valves 26 and 27 are operated to be opened in the pedal feel normal mode, the hydraulic pressure of the sub master cylinder 22 and the hydraulic pressure of the pedal-side hydraulic line 24 at the side of the sub master cylinder 22 become atmospheric pressure and, thus, hydraulic pressure for generation of a pedal feel may be generated by the pedal simulator 30 at the side of the main master cylinder 21 and the pedal hydraulic line 24 corresponding thereto.

Accordingly, the amount of fluid and hydraulic pressure, introduced into the pedal simulator 30 may be increased under the condition of the same foot effort of the driver, as compared to those of the pedal feel normal mode of FIG. 4, and, thus, a soft pedal feel may be transmitted to the driver. Thus, it may be possible to set and adjust a pedal feel for the driver in a normal mode or a soft mode based on mode setting by the driver, using the two master cylinders 21 and 22 and the two simulator valves 26 and 27 and operating each simulator valve.

In particular, under the condition that the driver has selected a desired pedal feel mode by operating an operating device such as a switch or other input device, the controller may be configured to drive each simulator valve based on the mode selected by the driver and, thus, a foot effort and a pedal feel in one of the normal mode and soft mode may be provided.

Figure 6:
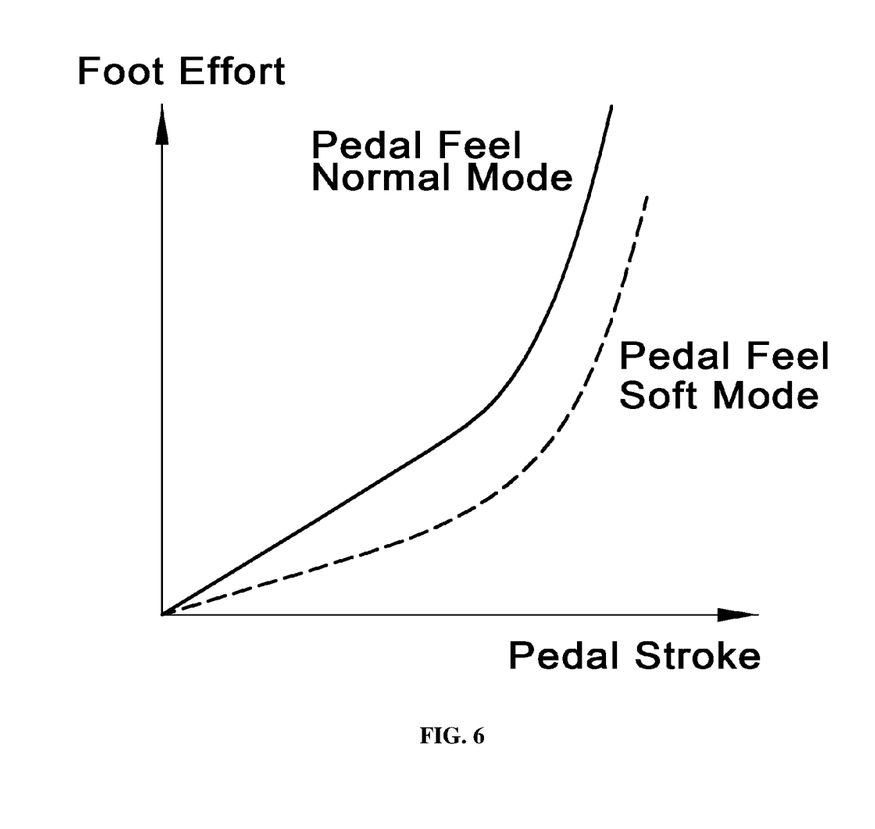
FIG. 6 is a graph showing foot efforts according to pedal strokes in the brake system according to the exemplary embodiment of the present invention in the pedal feel normal mode and pedal feel soft mode.
Figure 7:
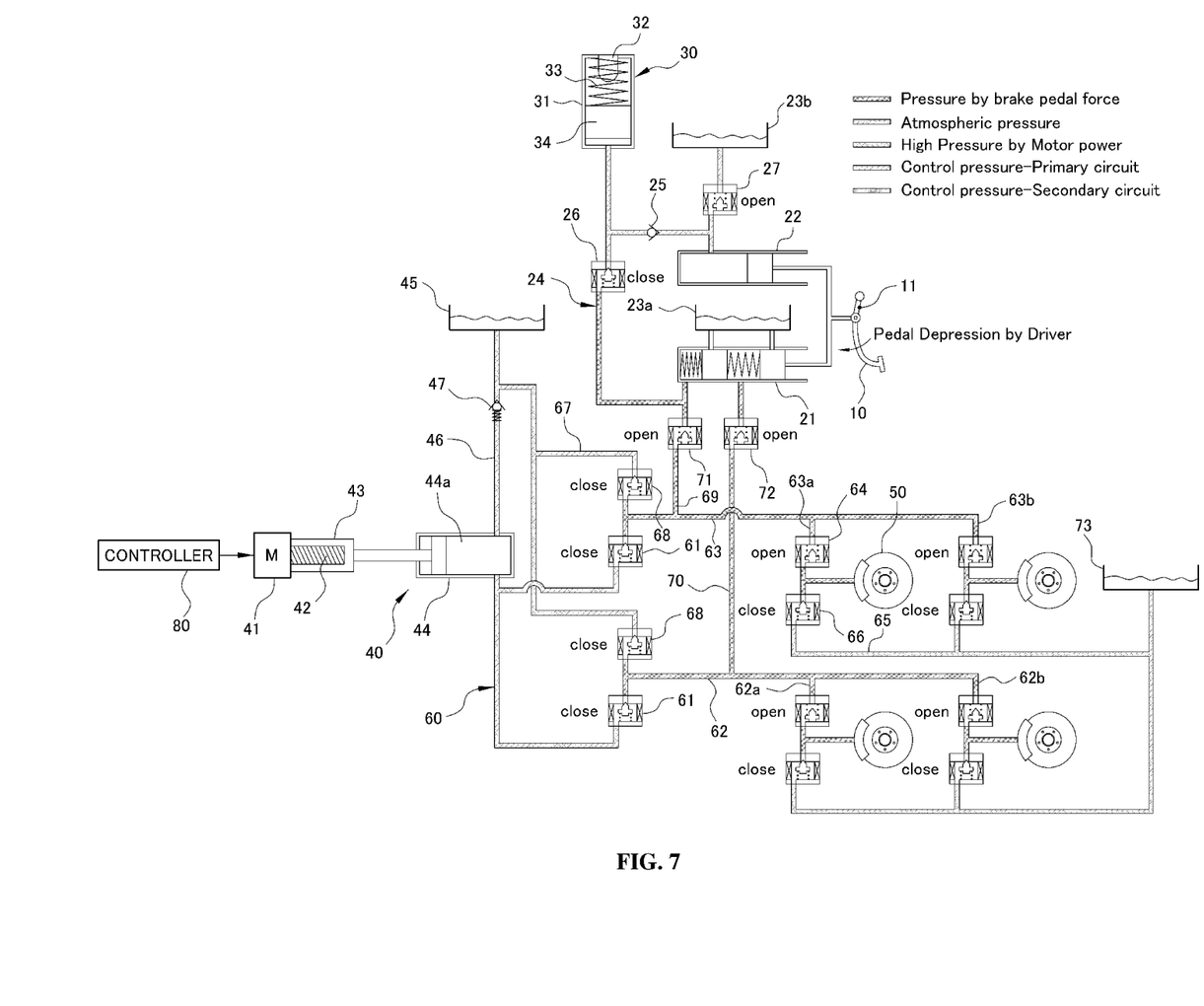
FIG. 7 is a diagram illustrating a backup braking state when the brake system according to the exemplary embodiment of the present invention fails.

Referring to FIG. 6, it can be seen that a smaller foot effort is required in the pedal feel soft mode than in the pedal feel normal mode, under the same pedal stroke conditions. Meanwhile, FIG. 7 is a diagram illustrating a backup braking state when the system has failed. When failure occurs at the pressure generator 40 or the like, for example, when failure occurs at the motor 41 or other elements of the pump, operation of the motor 41 in the pump and operations of the pressure reducing valve 68 and boosting valve 61 may be stopped (e.g., closed states of both the pressure reducing valve and the boosting valve), and the first cut valve 71 and second cut valve 72 may be opened by the controller.

Particularly, the first simulator valve 26 may be closed, and the second simulator valve 27 may be opened, and, thus, the side of the sub master cylinder 22 is at atmospheric pressure. In other words, no hydraulic pressure is formed at the sub master cylinder 22. As a result, no pressure is formed at the pedal simulator 30. Accordingly, hydraulic pressure generated from the main master cylinder 21 by the foot effort of the driver may be transferred to each wheel cylinder 50 via the pedal-side hydraulic line 24 and hydraulic pressure supply line 60 and braking force may be generated. Thus, the foot effort generated when the user depresses the brake pedal 10 may be utilized only for generation of hydraulic pressure by the main master cylinder 21 and increased hydraulic pressure may be transferred to each wheel cylinder 50, thereby generating increased braking force. Accordingly, an enhancement in backup braking performance may be achieved.

As apparent from the above description, the present invention provides a brake system capable of improving a hydraulic booster brake system including a pedal simulator, namely, achieving an enhancement in backup braking performance and achieving an enhancement in design freedom of the pedal simulator. In addition, it may be possible that various pedal feel modes may be adjusted to desired pedal feel modes selected by the driver, through control of valves.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. An electronic hydraulic brake system, comprising:
   a brake pedal to be operated by a driver, for braking of a vehicle;
   a master cylinder connected to the brake pedal, to generate a hydraulic pressure upon receiving a foot effort of the driver via the brake pedal; and
   a pedal simulator connected to the master cylinder via a pedal-side hydraulic line, to provide a pedal feel based on the foot effort of the driver, using the hydraulic pressure generated from the master cylinder,
   wherein the master cylinder comprises
      a main master cylinder connected to the brake pedal while being connected to the pedal simulator via the pedal-side hydraulic line, and
      a sub master cylinder connected to the brake pedal while being connected to the pedal simulator and to a fluid reservoir via the pedal-side hydraulic line,
   wherein a first simulator valve is installed at a portion of the pedal-side hydraulic line between the main master cylinder and the pedal simulator, and
   wherein a second simulator valve is installed at a portion of the pedal-side hydraulic line between the sub master cylinder and the fluid reservoir.

2. The electronic hydraulic brake system of claim 1, wherein a check valve is installed at a portion of the pedal-side hydraulic line between the sub master cylinder and the pedal simulator, to prevent reverse flow of fluid from the pedal simulator to the sub master cylinder while allowing fluid only to flow from the sub master cylinder to the pedal simulator.

3. The electronic hydraulic brake system of claim 2, further comprising:
   a controller configured to execute opening and closing operations of the first and second simulator valves, to open the first simulator valve while closing the second simulator valve upon receiving a braking input generated based on operation of the brake pedal by the driver.

4. The electronic hydraulic brake system of claim 1, wherein the pedal-side hydraulic line includes a hydraulic line portion branched from a hydraulic line portion between the sub master cylinder and the second simulator valve, and connected to the pedal simulator.

5. The electronic hydraulic brake system of claim 4, wherein the branched hydraulic line portion is joined to a hydraulic line portion between the pedal simulator and the first simulator valve, and a check valve is installed at the branched hydraulic line portion, to prevent reverse flow of fluid from the pedal simulator to the sub master cylinder while allowing fluid only to flow from the sub master cylinder to the pedal simulator.

6. The electronic hydraulic brake system of claim 1, further comprising:
   a controller configured to execute opening and closing operations of the first and second simulator valves, to open the first simulator valve while closing the second simulator valve upon receiving a braking input generated based on operation of the brake pedal by the driver.

7. The electronic hydraulic brake system of claim 1, further comprising:
   a controller configured to execute opening and closing operations of the first and second simulator valves based on a user selected mode from pedal feel modes upon receiving a braking input generated based on operation of the brake pedal by the driver.

8. The electronic hydraulic brake system of claim 7, wherein the pedal feel modes include:
   a pedal feel normal mode in which the first simulator valve is opened, and the second simulator valve is closed; and
   a pedal feel soft mode in which the first and second simulator valves are opened.

9. The electronic hydraulic brake system of claim 1, further comprising:
   a pressure generator configured to generate a braking hydraulic pressure;
   wheel brakes each configured to receive the braking hydraulic pressure generated from the pressure generator to generate a braking force to restrict rotation of a corresponding one of the wheels; and
   a hydraulic pressure supply line that connects the pressure generator to the wheel brakes to supply the braking hydraulic pressure generated from the pressure generator to the wheel brakes, wherein a cut valve is installed at a fluid line that connects the hydraulic pressure supply line to the pedal-side hydraulic line.

10. The electronic hydraulic brake system of claim 9, further comprising:
a controller configured to execute opening and closing operations of the first and second simulator valves and opening and closing operations of the cut valve,
wherein the controller is configured to close the first simulator valve while opening the second simulator valve and the cut valve when failure of the pressure generator occurs.

11. The electronic hydraulic brake system of claim 10, wherein:
the hydraulic pressure supply line includes:
a first sub hydraulic pressure supply line configured to supply a braking hydraulic pressure from the pressure generator to one pair of the wheel brakes, and
a second sub hydraulic pressure supply line configured to supply the braking hydraulic pressure from the pressure generator to another pair of the wheel brakes; and
the cut valve includes:
a first cut valve installed at a fluid line that connects the second sub hydraulic pressure supply line to a portion of the pedal-side hydraulic line between the first simulator valve and the main master cylinder, and
a second cut valve installed at a fluid line that connects the first sub hydraulic pressure supply line to the main master cylinder.

12. The electronic hydraulic brake system of claim 11, further comprising:
a controller configured to execute opening and closing operations of the first and second simulator valves and opening and closing operations of the first and second cut valves,
wherein the controller is configured to close the first simulator valve while opening the second simulator valve and the first and second cut valves when failure of the pressure generator occurs.

13. The electronic hydraulic brake system of claim 1, further comprising:
a pressure generator configured to generate a braking hydraulic pressure;
wheel brakes each configured to receive the braking hydraulic pressure generated from the pressure generator to generate a braking force to restrict rotation of a corresponding one of the wheels; and
a hydraulic pressure supply line that connects the pressure generator to the wheel brakes to supply the braking hydraulic pressure generated from the pressure generator to the wheel brakes,
wherein a boosting valve is installed at the hydraulic pressure supply line that connects the pressure generator to the wheel brakes; and
wherein a pressure reducing valve is installed at a fluid line connected to a fluid reservoir, the fluid line being branched from the hydraulic pressure supply line.

14. The electronic hydraulic brake system of claim 13, further comprising:
a controller configured to execute operation of the boosting valve and operation of the pressure reducing valve, to execute operation of the pressure generator or operations of the boosting and pressure reducing valves based on a foot effort of the driver, to adjust a braking hydraulic pressure supplied to the wheel brakes via the hydraulic pressure supply line.

15. The electronic hydraulic brake system of claim 13, wherein:
the hydraulic pressure supply line includes:
a first sub hydraulic pressure supply line configured to supply a braking hydraulic pressure from the pressure generator to one pair of the wheel brakes, and
a second sub hydraulic pressure supply line configured to supply the braking hydraulic pressure from the pressure generator to another pair of the wheel brakes;
the boosting valve includes boosting valves respectively installed at the first and second sub hydraulic pressure supply lines; and
the pressure reducing valve includes pressure reducing valves respectively installed at fluid lines each connected to the fluid reservoir branched from a corresponding one of the sub hydraulic pressure supply lines.

16. The electronic hydraulic brake system of claim 15, further comprising:
a controller configured to execute operations of the boosting valves and operations of the pressure reducing valves, to execute operation of the pressure generator or operations of the boosting and pressure reducing valves based on a foot effort of the driver to adjust a braking hydraulic pressure supplied to the wheel brakes via the sub hydraulic pressure supply lines.

* * * * *